United States Patent
Manolakos et al.

(10) Patent No.: US 11,582,016 B2
(45) Date of Patent: Feb. 14, 2023

(54) REPETITION IN FULL-DUPLEX COMMUNICATION

(71) Applicant: QUALCOMM Incorporated, San Diego, CA (US)

(72) Inventors: Alexandros Manolakos, Escondido, CA (US); Seyedkianoush Hosseini, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 16/948,703

(22) Filed: Sep. 29, 2020

(65) Prior Publication Data

US 2021/0320780 A1    Oct. 14, 2021

(30) Foreign Application Priority Data

Apr. 10, 2020    (GR) .............................. 20200100186

(51) Int. Cl.
*H04L 5/16*        (2006.01)
*H04L 1/1809*    (2023.01)
*H04L 5/14*        (2006.01)

(52) U.S. Cl.
CPC .............. *H04L 5/16* (2013.01); *H04L 1/1809* (2013.01); *H04L 5/1438* (2013.01)

(58) Field of Classification Search
CPC ........ H04L 5/16; H04L 1/1809; H04L 5/1438
See application file for complete search history.

(56) References Cited

U.S. PATENT DOCUMENTS

| | | | |
|---|---|---|---|
| 2017/0202008 A1* | 7/2017 | Nader | H04W 72/1273 |
| 2018/0069688 A1* | 3/2018 | Arregui De La Cruz | H04L 69/22 |
| 2018/0279327 A1* | 9/2018 | Ying | H04W 72/0446 |
| 2020/0015206 A1* | 1/2020 | Lee | H04W 72/0446 |

FOREIGN PATENT DOCUMENTS

WO    WO-2018170670 A1 *    9/2018

* cited by examiner

*Primary Examiner* — Jackie Zuniga Abad
(74) *Attorney, Agent, or Firm* — Harrity & Harrity, LLP

(57) ABSTRACT

Various aspects of the present disclosure generally relate to wireless communication. In some aspects, a user equipment (UE) may receive a grant that schedules multiple repetitions of a communication. A first repetition, of the multiple repetitions of the communication, is to be transmitted or received in a time domain interval configured for one of half-duplex communication or full-duplex communication. A repetition, of the multiple repetitions of the communication, is to be transmitted or received in another time domain interval configured for the other of half-duplex communication or full-duplex communication. The UE may transmit or receive one or more of the multiple repetitions of the communication based at least in part on the configuration of the time domain interval of the first repetition. Numerous other aspects are provided.

30 Claims, 12 Drawing Sheets

REPETITION IN FULL-DUPLEX COMMUNICATION

CROSS-REFERENCE TO RELATED APPLICATION

This Patent Application claims priority to Greece Patent Application No. 20200100186, filed on Apr. 10, 2020, entitled "REPETITION IN FULL-DUPLEX COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for repetition in full-duplex (FD) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving a grant that schedules multiple repetitions of a communication, where a first repetition, of the multiple repetitions of the communication, is to be transmitted or received in a time domain interval configured for one of half-duplex communication or full-duplex communication, and where a repetition, of the multiple repetitions of the communication, is to be transmitted or received in another time domain interval configured for the other of half-duplex communication or full-duplex communication; and transmitting or receiving one or more of the multiple repetitions of the communication based at least in part on the configuration of the time domain interval of the first repetition.

In some aspects, a method of wireless communication, performed by a base station, may include transmitting, to a UE, a grant that schedules multiple repetitions of a communication, where a first repetition, of the multiple repetitions of the communication, is to be transmitted or received by the UE in a time domain interval configured for one of half-duplex communication or full-duplex communication, and where a repetition, of the multiple repetitions of the communication, is to be transmitted or received in another time domain interval configured for the other of half-duplex communication or full-duplex communication; and transmitting or receiving one or more of the multiple repetitions of the communication based at least in part on the configuration of the time domain interval of the first repetition.

In some aspects, a UE for wireless communication may include a memory and one or more processors operatively coupled to the memory. The memory and the one or more processors may be configured to receive a grant that schedules multiple repetitions of a communication, where a first repetition, of the multiple repetitions of the communication, is to be transmitted or received in a time domain interval configured for one of half-duplex communication or full-duplex communication, and where a repetition, of the multiple repetitions of the communication, is to be transmitted or received in another time domain interval configured for the other of half-duplex communication or full-duplex communication; and transmit or receive one or more of the multiple repetitions of the communication based at least in part on the configuration of the time domain interval of the first repetition.

In some aspects, a base station for wireless communication may include a memory and one or more processors operatively coupled to the memory. The memory and the one or more processors may be configured to transmit, to a UE, a grant that schedules multiple repetitions of a communication, where a first repetition, of the multiple repetitions of the communication, is to be transmitted or received by the UE in a time domain interval configured for one of half-duplex communication or full-duplex communication, and where a repetition, of the multiple repetitions of the communication, is to be transmitted or received in another time domain interval configured for the other of half-duplex communication or full-duplex communication; and transmit or receive one or more of the multiple repetitions of the communication based at least in part on the configuration of the time domain interval of the first repetition.

In some aspects, a non-transitory computer-readable medium may store one or more instructions for wireless communication. The one or more instructions, when executed by one or more processors of a UE, may cause the one or more processors to receive a grant that schedules multiple repetitions of a communication, where a first repetition, of the multiple repetitions of the communication, is to be transmitted or received in a time domain interval configured for one of half-duplex communication or full-duplex communication, and where a repetition, of the multiple repetitions of the communication, is to be transmitted or received in another time domain interval configured for the other of half-duplex communication or full-duplex communication; and transmit or receive one or more of the multiple repetitions of the communication based at least in part on the configuration of the time domain interval of the first repetition.

In some aspects, a non-transitory computer-readable medium may store one or more instructions for wireless communication. The one or more instructions, when executed by one or more processors of a base station, may cause the one or more processors to transmit, to a UE, a grant that schedules multiple repetitions of a communication, where a first repetition, of the multiple repetitions of the communication, is to be transmitted or received by the UE in a time domain interval configured for one of half-duplex communication or full-duplex communication, and where a repetition, of the multiple repetitions of the communication, is to be transmitted or received in another time domain interval configured for the other of half-duplex communication or full-duplex communication; and transmit or receive one or more of the multiple repetitions of the communication based at least in part on the configuration of the time domain interval of the first repetition.

In some aspects, an apparatus for wireless communication may include means for receiving a grant that schedules multiple repetitions of a communication, where a first repetition, of the multiple repetitions of the communication, is to be transmitted or received in a time domain interval configured for one of half-duplex communication or full-duplex communication, and where a repetition, of the multiple repetitions of the communication, is to be transmitted or received in another time domain interval configured for the other of half-duplex communication or full-duplex communication; and means for transmitting or receiving one or more of the multiple repetitions of the communication based at least in part on the configuration of the time domain interval of the first repetition.

In some aspects, an apparatus for wireless communication may include means for transmitting, to a UE, a grant that schedules multiple repetitions of a communication, where a first repetition, of the multiple repetitions of the communication, is to be transmitted or received by the UE in a time domain interval configured for one of half-duplex communication or full-duplex communication, and where a repetition, of the multiple repetitions of the communication, is to be transmitted or received in another time domain interval configured for the other of half-duplex communication or full-duplex communication; and means for transmitting or receiving one or more of the multiple repetitions of the communication based at least in part on the configuration of the time domain interval of the first repetition.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
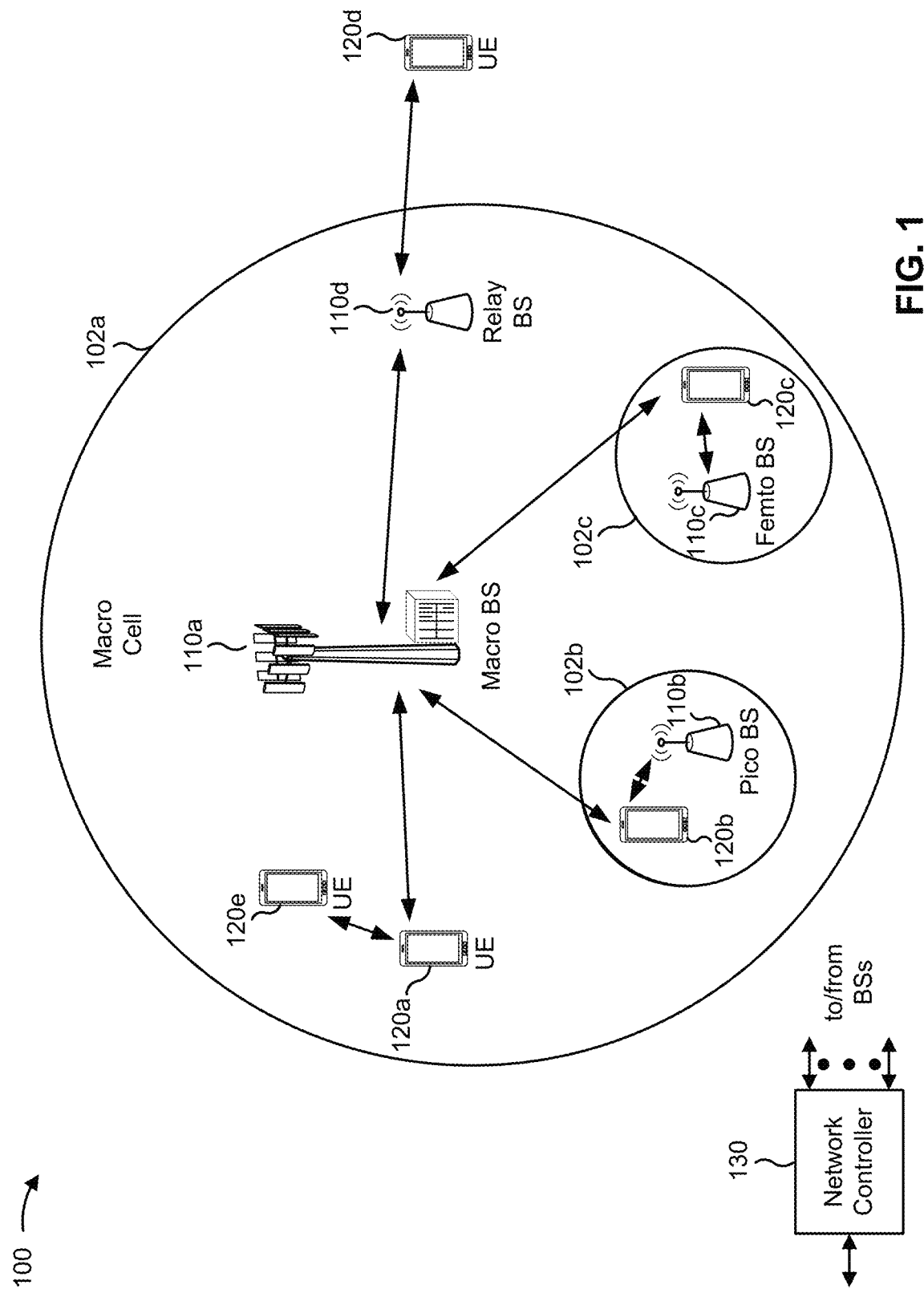
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
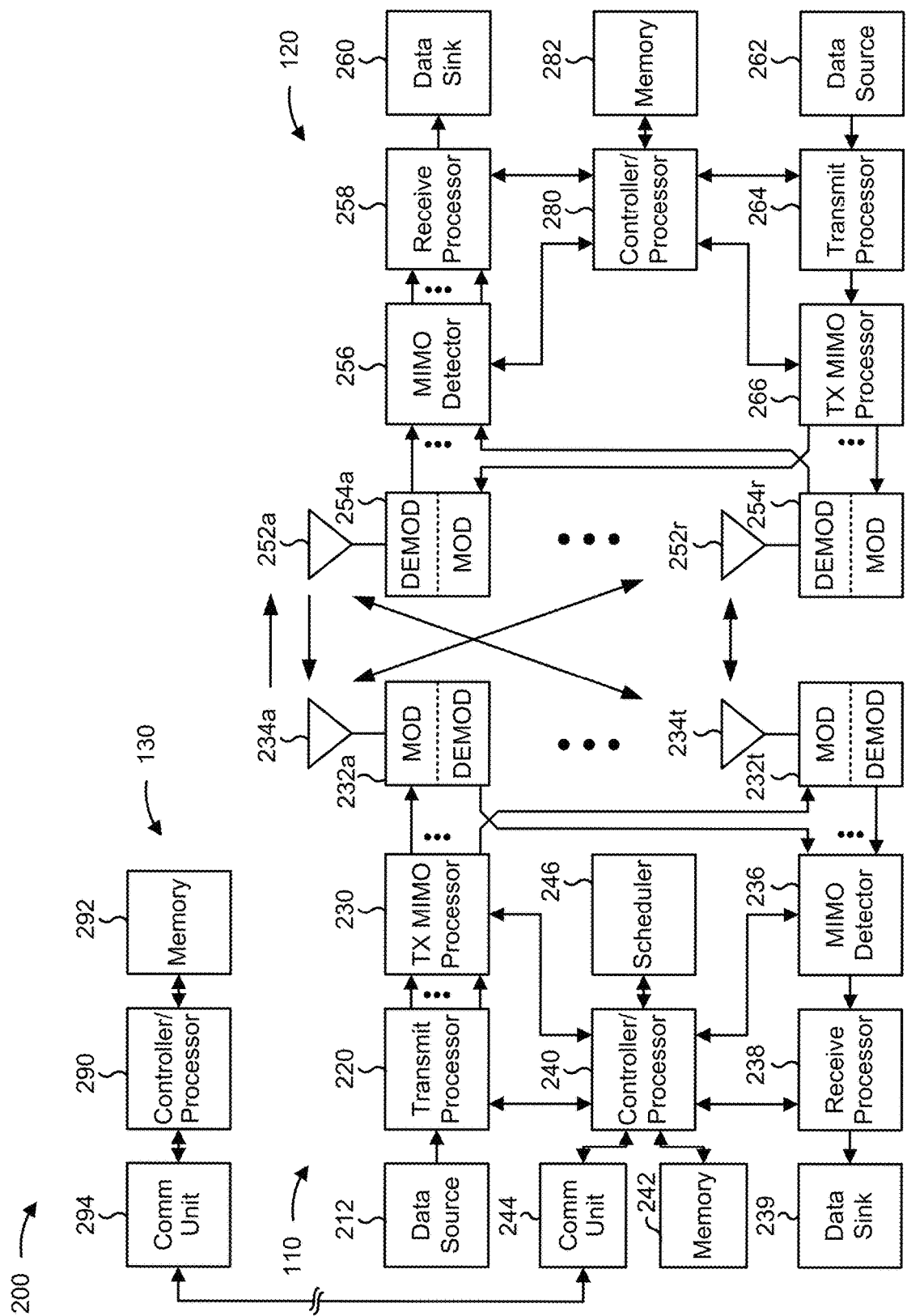
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with repetition in full-duplex (FD) communication, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1100 of FIG. 11, process 1200 of FIG. 12, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a grant that schedules multiple repetitions of a communication, where a first repetition, of the multiple repetitions of the communication, is to be transmitted or received in a time domain interval configured for one of half-duplex communication or full-duplex communication and where a repetition, of the multiple repetitions of the communication, is to be transmitted or received in another time domain interval configured for the other of half-duplex communication or full-duplex communication, means for transmitting or receiving one or more of the multiple repetitions of the communication based at least in part on the configuration of the time domain interval of the first repetition, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a grant that schedules multiple repetitions of a communication, where a first repetition, of the multiple repetitions of the communication, is to be transmitted or received by the UE in a time domain interval configured for one of half-duplex communication or full-duplex communication and where a repetition, of the multiple repetitions of the communication, is to be transmitted or received in another time domain interval configured for the other of half-duplex communication or full-duplex communication, means for transmitting or receiving one or more of the multiple repetitions of the communication based at least in part on the configuration of the time domain interval of the first repetition, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
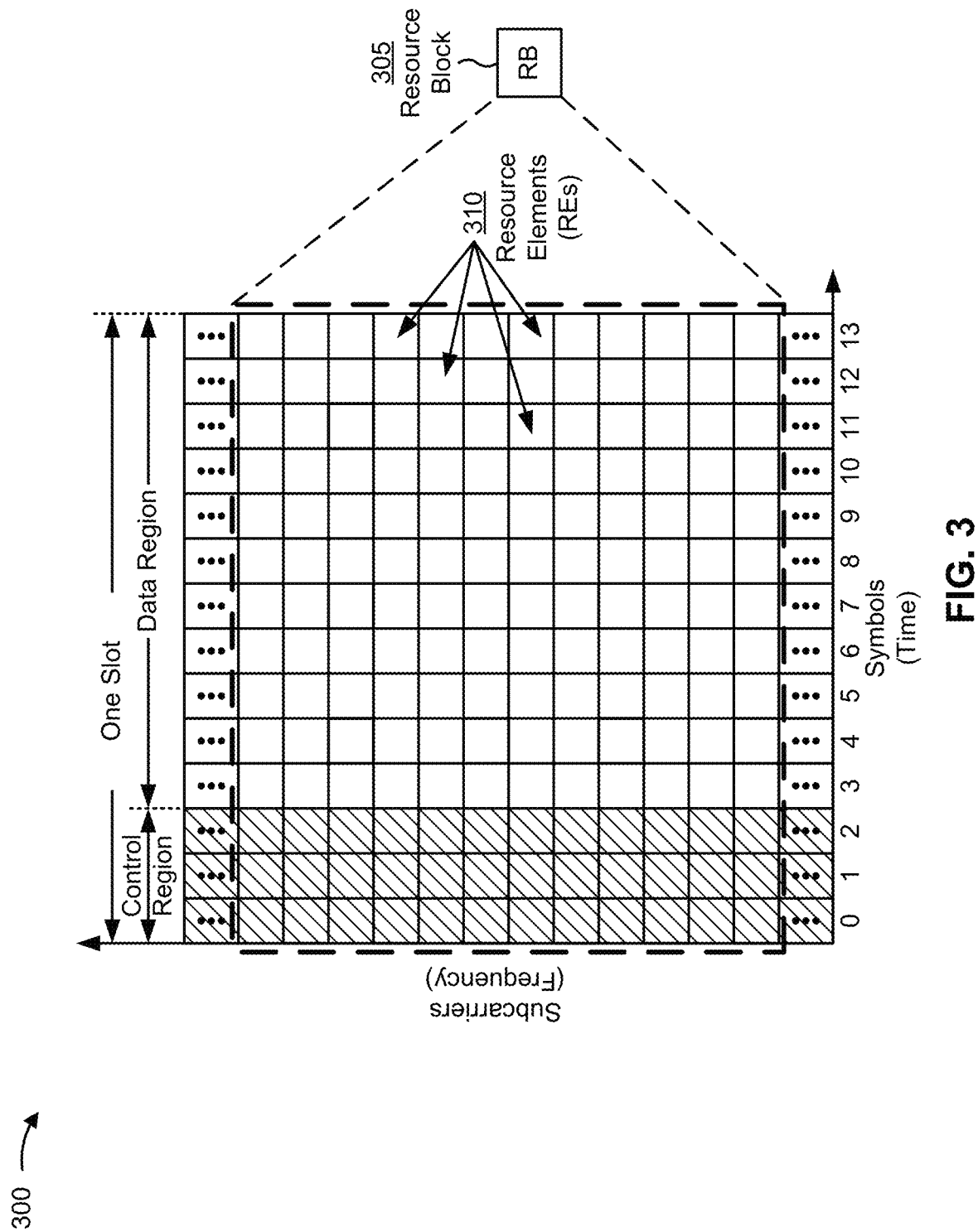
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figure 4:
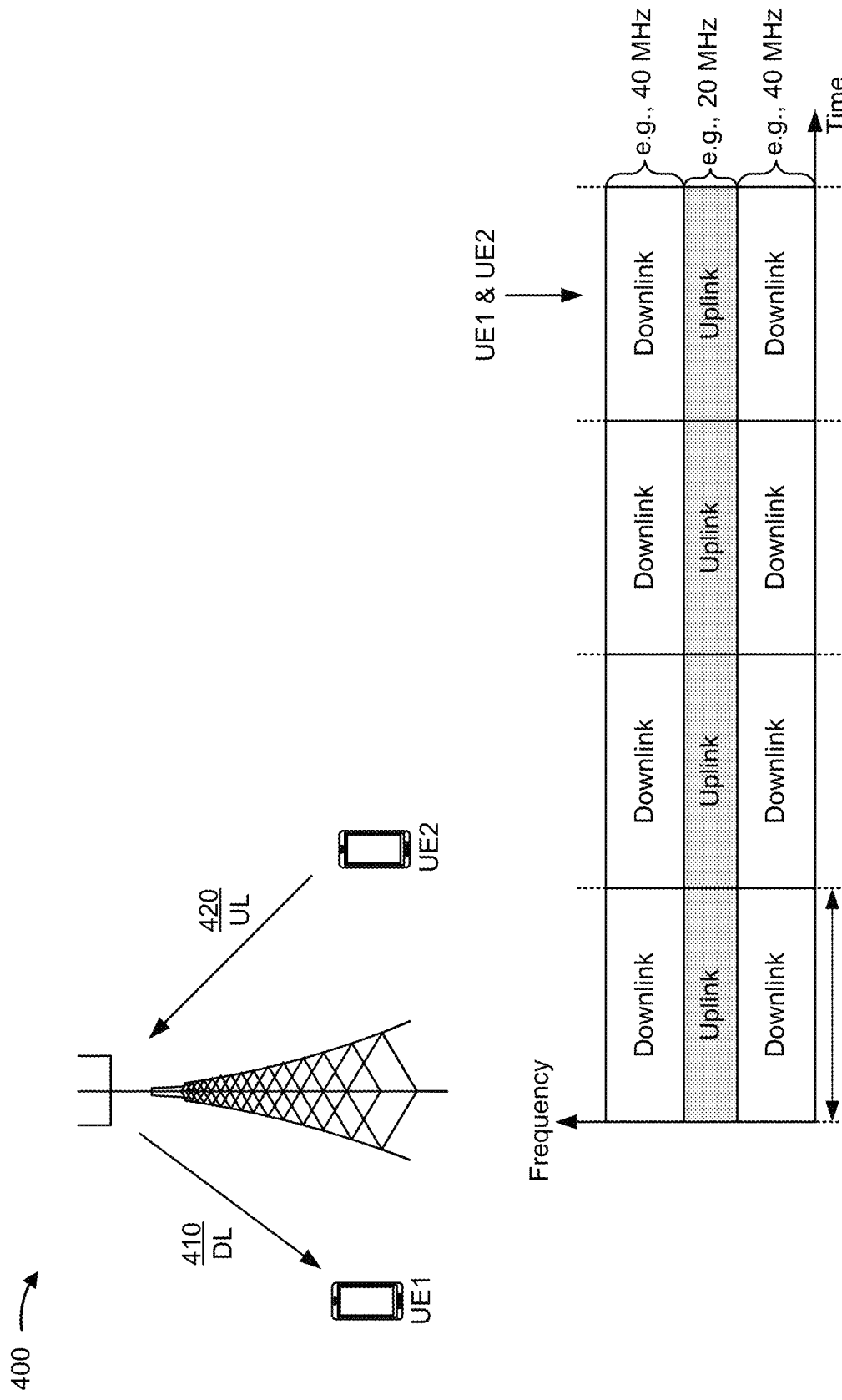
FIG. 4 is a diagram illustrating an example of full-duplex (FD) communication, in accordance with various aspects of the present disclosure.

FIG. 4 is a diagram illustrating an example 400 of FD communication, in accordance with various aspects of the present disclosure. As shown, example 400 includes a base station (e.g., BS 110 and/or the like), a UE1 (e.g., UE 120 and/or the like), and a UE2 (e.g., UE 120 and/or the like). In some aspects, the base station may be capable of FD communication. FD communication may include a contemporaneous uplink and downlink communication using the same resources. For example, the base station may perform a downlink (DL) transmission to a UE1 (shown by reference number 410) and may receive an uplink (UL) transmission from a UE2 (shown by reference number 420) using the same frequency resources and at least partially overlapping in time. As shown in FIG. 4, in a particular slot, UE1 may receive a downlink transmission in frequency domain resources for downlink, and UE2 may perform an uplink transmission in frequency domain resources for uplink. Full duplex communication may be enabled at a base station, a UE, or both.

As indicated above, FIG. 4 is provided as an example. Other examples may differ from what is described with respect to FIG. 4.

Figure 5:
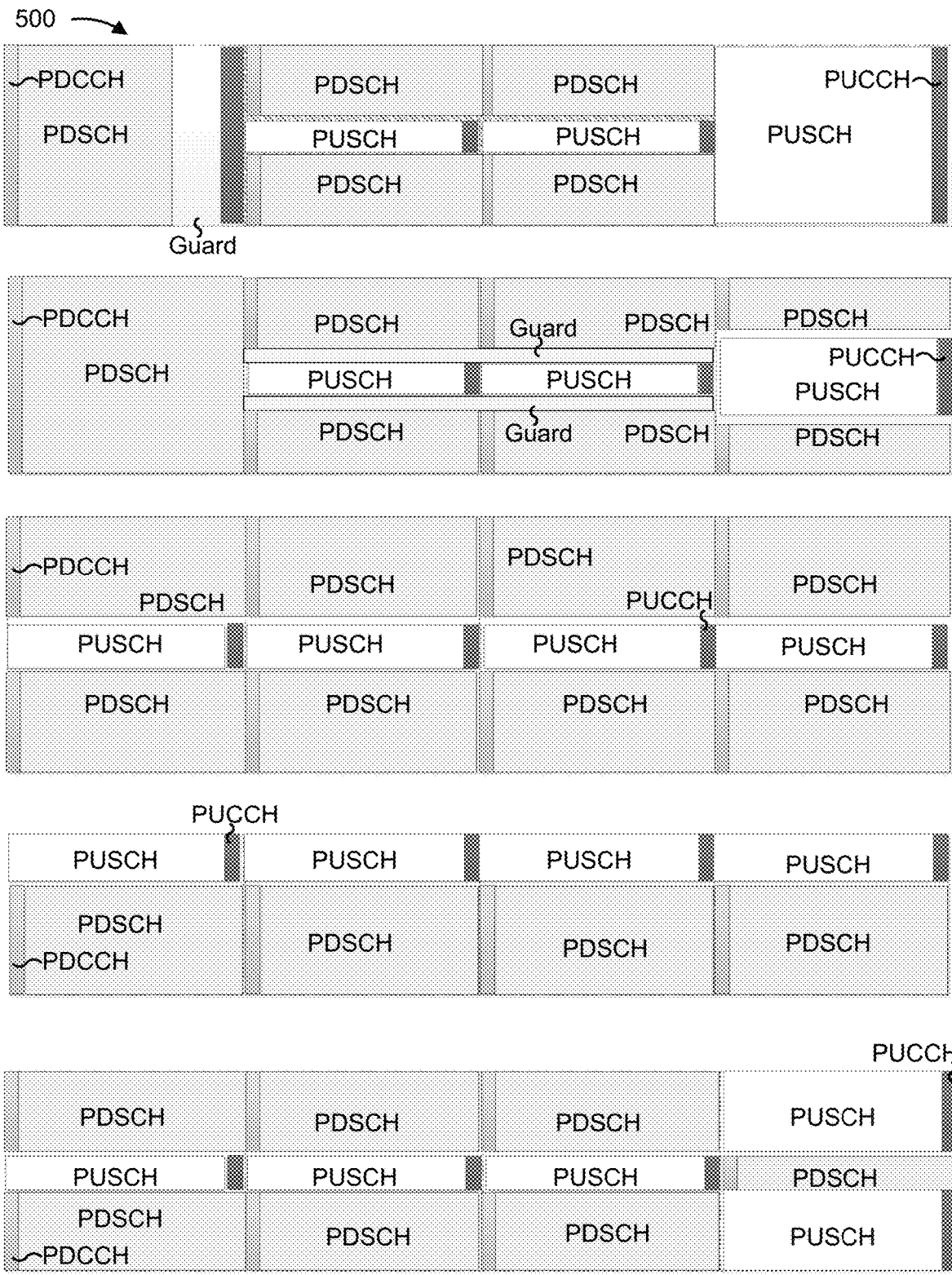
FIG. 5 is a diagram illustrating one or more examples of FD slot structures, in accordance with various aspects of the present disclosure.

FIG. 5 is a diagram illustrating one or more examples 500 of FD slot structures, in accordance with various aspects of the present disclosure. Examples 500 show FD slot structures for frequency division duplexing (FDD) in a component carrier bandwidth of a wireless communication system. As shown, the slot structures may include resources for a physical downlink shared channel (PDSCH), a physical uplink shared channel (PUSCH), a physical downlink control channel (PDCCH), a physical uplink control channel (PUCCH), and/or the like.

As shown, the slot structures include multiple slots (e.g., four slots). Moreover, a slot may be configured for half-duplex (HD) communication (e.g., resources for uplink communication and downlink communication do not overlap in a time domain—for example, the resources may use time division duplexing (TDD)) or FD communication (e.g., resources for uplink communication and downlink communication overlap in a time domain). For example, an FD slot structure may include slots configured only for FD communication, or may include one or more slots configured for FD communication and one or more slots configured for HD communication.

For slots configured for FD communication, there may be a frequency guard band between frequency resources for uplink communication and frequency resources for downlink communication. The guard band may provide some separation between frequency resources in order to mitigate crosslink interference. For slots configured for HD communication (e.g., using TDD), there may a guard time between time resources for uplink communication and time resources for downlink communication. The guard time provides time for a switch-over from downlink communication to uplink communication, or from uplink communication to downlink communication.

Although the examples 500 of slot structures are described as having multiple slots, in some aspects, a slot structure may represent a single slot having multiple time domain intervals (e.g., intervals of one or more symbols) configured for FD communication and/or HD communication, as described above. In some aspects, a time domain interval may include a slot or a set of one or more symbols within a slot.

As described above, multiple time domain intervals (e.g., multiple slots, or multiple sets of symbols within a slot) may be configured for FD communication or HD communication. For example, one or more of the multiple time domain intervals may be configured for FD communication, and one or more of the multiple time domain intervals may be configured for HD communication. In some cases, a UE may receive scheduling for multiple repetitions of a communication (e.g., an uplink communication or a downlink communication) that are to be transmitted or received over the multiple time domain intervals.

However, for example, if downlink repetitions are to start in a downlink HD time domain interval, and one or more subsequent reception opportunities are in FD time domain intervals, the UE may not be enabled to determine whether, or how, the repetitions are to be received in the FD time domain intervals. This is because the downlink repetitions may be configured to use a resource that overlaps with uplink, or guard band, frequency resources in the FD time domain intervals. Some techniques and apparatuses described herein provide for transmission or reception of repetitions in time domain intervals that may be configured for HD communication or FD communication.

As indicated above, FIG. 5 is provided as an example. Other examples may differ from what is described with respect to FIG. 5.

Figure 6:
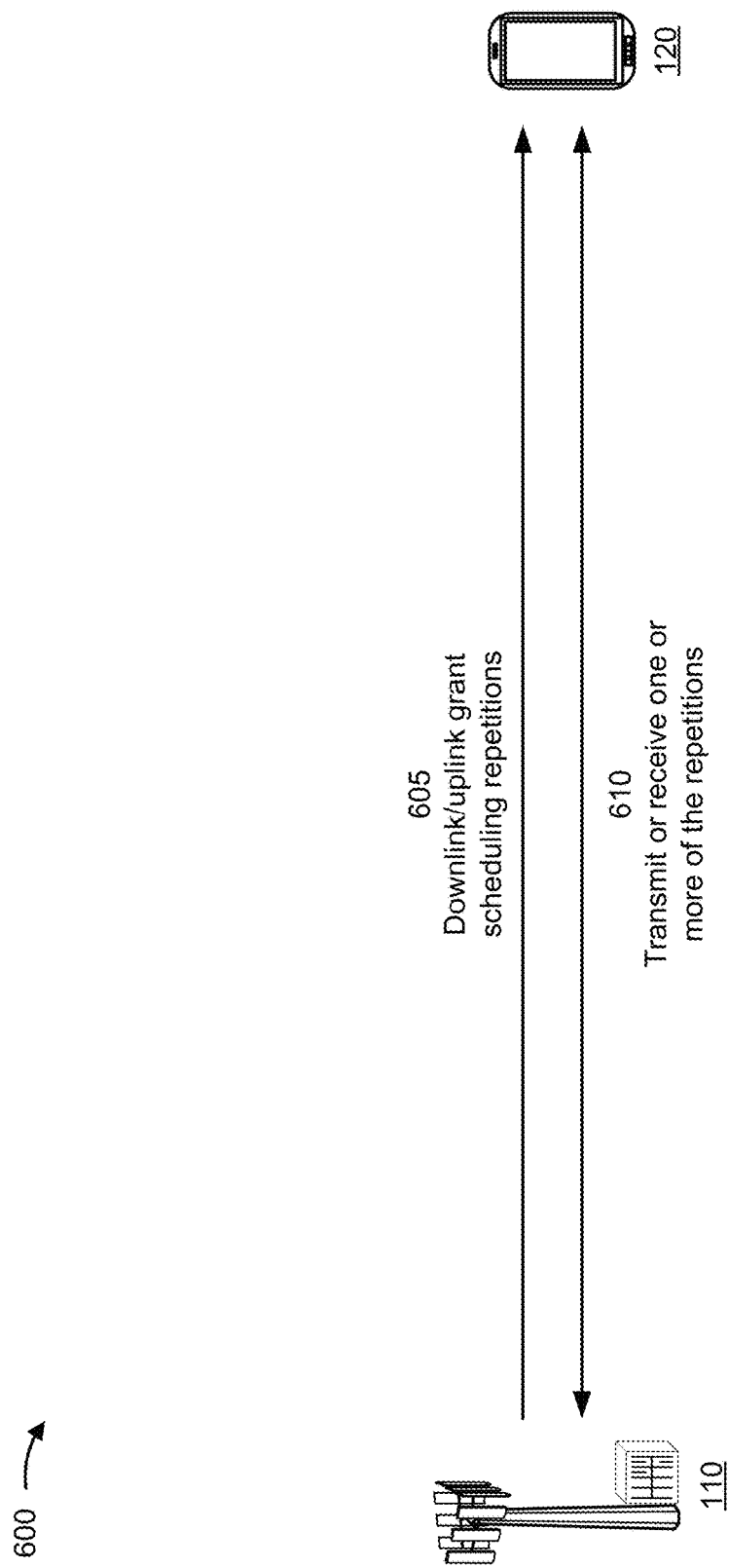
FIGS. 6-10 are diagrams illustrating examples of repetition in FD communication, in accordance with various aspects of the present disclosure.

FIG. 6 is a diagram illustrating an example 600 of repetition in FD communication, in accordance with various aspects of the present disclosure. As shown in FIG. 6, a base station 110 and a UE 120 may communicate with one another. In some aspects, the base station 110 and/or the UE 120 may be enabled for FD communication.

As shown by reference number 605, the base station 110 may transmit, and the UE 120 may receive, a grant that schedules multiple repetitions of a communication. The grant may be, or may be included in, downlink control information (DCI) transmitted by the base station 110 (e.g., in a PDCCH), may be a configured grant for uplink transmissions, or may be a semi-persistent scheduling. The communication may be an uplink communication that is to be transmitted by the UE 120 (e.g., in a PUSCH) or a downlink communication that is to be received by the UE 120 (e.g., in a PDSCH). The multiple repetitions of the communication may be scheduled in a component carrier that is configured with one or more time domain intervals for HD communication and one or more time domain intervals for FD communication.

The repetitions of the communication may be scheduled for transmission or reception in respective time domain intervals. For example, the respective time domain intervals may be respective slots, respective sets of symbols (e.g., sets of one or more symbols) within a single slot, and/or the like. Accordingly, the repetitions of the communication may be intra-slot repetitions or inter-slot repetitions. A quantity of repetitions of the communication scheduled by the grant may be referred to as a nominal quantity of repetitions for the communication, because an actual quantity of repetitions of the communication that are transmitted or received by the UE 120 may differ from the grant, as described below.

In some aspects, the UE 120 may receive the grant (e.g., DCI) in a same time domain interval in which a first repetition, of the multiple repetitions, is to be transmitted or received by the UE 120. In some aspects, the grant may schedule the UE 120 to transmit or receive the first repetition in a different time domain interval from the time domain interval in which the grant is received by the UE 120. The time domain interval in which the UE 120 is to transmit or receive the first repetition may be configured for one of HD communication or FD communication.

Accordingly, the UE 120 may determine that one or more of the repetitions are to be transmitted or received in respective time domain interval(s) that are also configured for the same one of HD communication or FD communication (e.g., respective time domain intervals that include uplink resources, in the case of uplink repetitions, or downlink resources in the case of downlink repetitions). For example, if the first repetition is to be transmitted or received in an HD time domain interval, the UE 120 may determine that the remaining repetitions are to be transmitted or received in HD time domain intervals (e.g., HD time domain intervals that include uplink resources, in the case of uplink repetitions, or downlink resources in the case of downlink repetitions). Similarly, if the first repetition is to be transmitted or received in an FD time domain interval, the UE 120 may determine that the remaining repetitions are to be transmitted or received in FD time domain intervals.

As shown by reference number 610, the UE 120 may transmit or receive one or more of the repetitions. For example, the UE 120 may transmit, and the base station 110 may receive, one or more uplink repetitions. As another example, the base station 110 may transmit, and the UE 120 may receive, one or more downlink repetitions.

The UE 120 may transmit or receive the one or more repetitions based at least in part on the duplexing configuration of the time domain interval for the first repetition. In some aspects, the UE 120 may determine that a repetition (that follows the first repetition) is to be transmitted or received (e.g., according to a next available transmission opportunity, in the case of uplink repetitions, or next available reception opportunity in the case of downlink repetitions) in a time domain interval configured for the other of HD communication or FD communication relative to the time domain interval associated with the first repetition. A time domain interval configured for the other of HD communication or FD communication relative to the time domain interval associated with the first repetition may be referred to herein as a differing time domain interval.

The UE 120 may modify transmission or reception of a repetition based at least in part on determining that the repetition is to be transmitted or received in a differing time domain interval. As an example, if the first repetition is in an HD time domain interval, the UE 120 may modify transmission or reception of a repetition in an FD time domain interval.

In some aspects, when transmitting or receiving the repetitions, the UE 120 may skip (e.g., drop) a repetition (with the skipped repetition counting toward the nominal quantity of repetitions) based at least in part on determining that the repetition is to be transmitted or received in a differing time domain interval, as described below in connection with FIG. 7. In some aspects, the UE 120 may skip the repetition when the repetition uses a resource that overlaps with frequency resources, in the differing time domain interval, that are not to be used for a type of the repetition (e.g., uplink or downlink), as described below in connection with FIG. 7. For example, if the repetition is a downlink repetition, the UE 120 may skip the repetition when the resource overlaps with guard band and/or uplink frequency resources in the differing time domain interval.

In some aspects, when transmitting or receiving the repetitions, the UE 120 may map the repetition to a portion of a resource (e.g., a resource used for the repetitions) that does not overlap with frequency resources, in the differing time domain interval, that are not to be used for a type of the repetition (e.g., uplink or downlink), as described below in connection with FIG. 8. For example, if the repetition is a downlink repetition, the UE 120 may rate match (e.g., sub-band rate match) the repetition around guard band and/or uplink frequency resources in the differing time domain interval. In some aspects, the UE 120 may also map a demodulation reference signal (DMRS) associated with the repetition to the portion of the resource.

In some aspects, the portion of the resource may be defined by one or more precoding resource block group (PRG) boundaries. For example, if a first boundary for a PRG does not overlap with the frequency resources, and a second boundary for the PRG overlaps with the frequency resources, a boundary for the portion of the resource may correspond to the first boundary for the PRG (e.g., so that the portion of the resource does not overlap with the frequency resources, and the PRG is not split between boundaries of the PRG).

In some aspects, when transmitting or receiving the repetitions, the UE 120 may skip a repetition (without the skipped repetition counting toward the nominal quantity of repetitions) based at least in part on determining that the repetition is to be transmitted or received in a differing time domain interval, as described below in connection with FIG. 9. In this case, the UE 120 may postpone transmission or reception of the repetition to a time domain interval with the same duplexing configuration as the time domain interval for the first repetition (and that includes uplink resources, in the case of uplink repetitions, or downlink resources in the case of downlink repetitions).

In some aspects, a time domain interval that is to be used for transmission or reception of a repetition may be configured for flexible use of HD communication or FD communication (e.g., a slot structure associated with the time domain interval may be semi-statically configured for flexible FD use). In this case, the UE 120 may determine that a type of the time domain interval (e.g., HD time domain interval or FD time domain interval) associated with the first repetition is to be given priority, and the UE 120 may use the flexible time domain interval as the type of the time domain interval associated with the first repetition, to thereby transmit or receive the repetition, as described below in connection with FIG. 10. For example, if the time domain interval for the first repetition is configured for HD communication, the UE 120 may use a flexible time domain interval (e.g., to transmit or receive a repetition) according to an HD communication configuration.

In some aspects, the UE 120 may be configured (e.g., by the base station 110) with an HD bandwidth part (BWP) configured for HD communication, and an FD BWP configured for FD communication. The HD BWP may be associated with time domain intervals configured for HD communication, and the FD BWP may be associated with time domain intervals configured for FD communication. Accordingly, a grant may schedule the multiple repetitions of the communication in the HD BWP, and therefore, the UE 120 may transmit or receive the repetitions in HD time domain intervals (e.g., thereby skipping FD time domain intervals). Similarly, a grant may schedule the multiple repetitions of the communication in the FD BWP, and therefore, the UE 120 may transmit or receive the repetitions in FD time domain intervals (e.g., thereby skipping HD time domain intervals).

In some aspects, the UE 120 may be configured (e.g., by the base station 110) with a single BWP or a component carrier, configured with an HD frequency region for HD communication and an FD frequency region for FD communication. The HD frequency region may be associated with time domain intervals configured for HD communication, and the FD frequency region may be associated with time domain intervals configured for FD communication. Accordingly, a grant may schedule the multiple repetitions of the communication in the HD frequency region, and therefore, the UE 120 may transmit or receive the repetitions in HD time domain intervals. Similarly, a grant may schedule the multiple repetitions of the communication in the FD frequency region, and therefore, the UE 120 may transmit or receive the repetitions in FD time domain intervals.

In some aspects, the base station 110 may also perform one or more of the actions described above for the UE 120. For example, the base station 110 may determine that a repetition (that follows a first repetition) is to be transmitted or received in a differing time domain interval, modify transmission or reception of a repetition based at least in part on determining that the repetition is to be transmitted or received in a differing time domain interval, and/or the like, as described above.

As indicated above, FIG. 6 is provided as an example. Other examples may differ from what is described with respect to FIG. 6.

Figure 7:
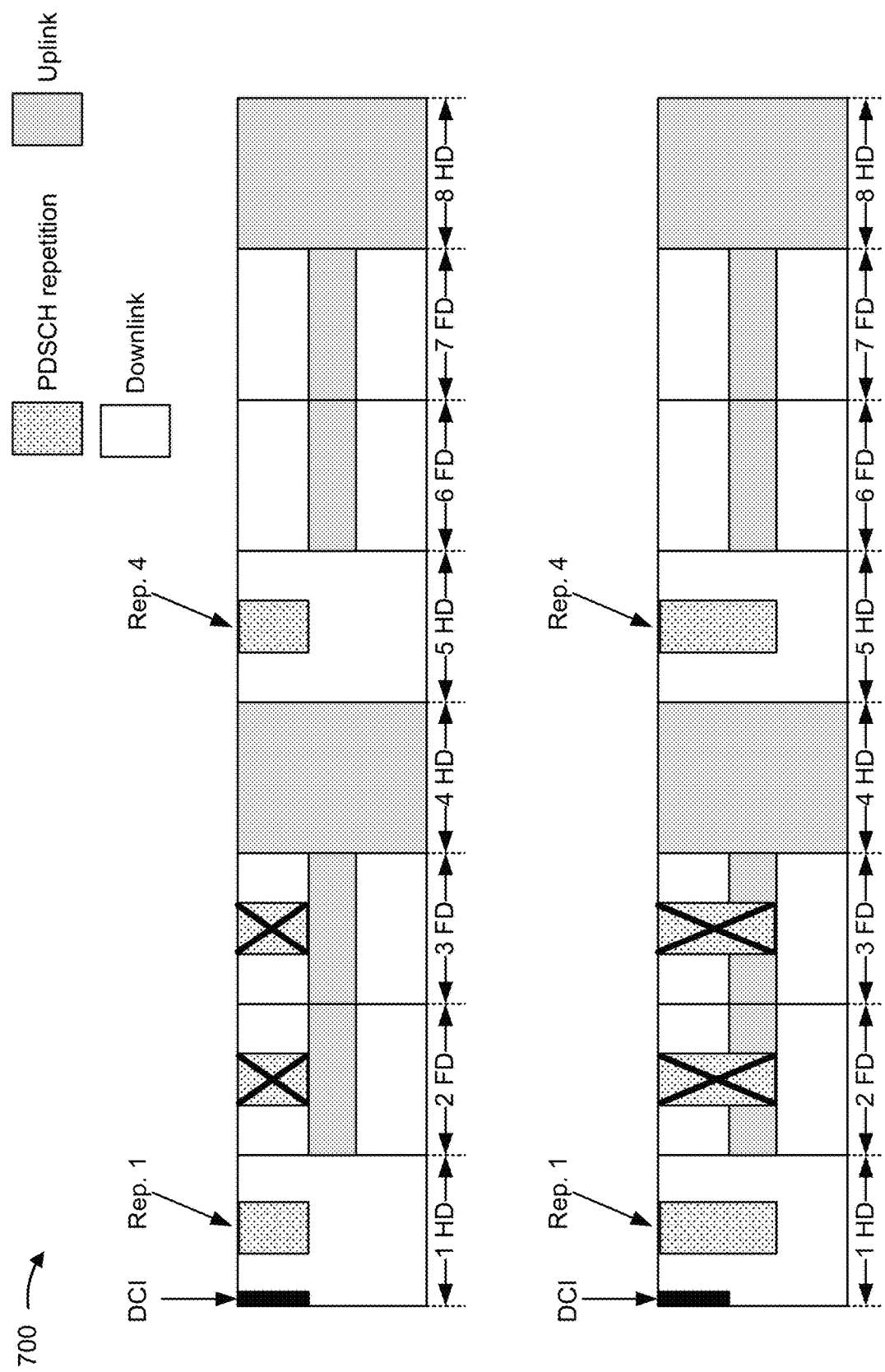

FIG. 7 is a diagram illustrating an example 700 of repetition in FD communication, in accordance with various aspects of the present disclosure. The repetitions of example 700 may correspond to the repetitions described above in connection with FIG. 6. Accordingly, the base station 110 may transmit, and the UE 120 may receive, the repetitions of example 700.

As shown in FIG. 7, DCI may schedule four repetitions of a PDSCH communication in multiple time domain intervals. Moreover, as shown, the UE 120 may receive a first downlink repetition in a first time domain interval (shown as 1 HD), which is configured for HD communication. In this case, the UE 120 may skip second and third downlink repetitions in reception opportunities in a second time domain interval (2 FD) and a third time domain interval (3 FD), configured for FD communication, because the second and third time domain intervals have different duplexing configurations than the first time domain interval (e.g., the second and third time domain intervals are differing time domain intervals from the first time domain interval).

In some aspects, the UE 120 may skip the second and third downlink repetitions only when a resource for the second and third downlink repetitions overlaps with frequency domain resources used for uplink communication and/or a guard band (shown in the lower diagram). In this case, if there is no overlap, the UE 120 may receive the second and third downlink repetitions.

As shown, there is no reception opportunity in a fourth time domain interval (4 HD), and therefore, the UE 120 does not receive a downlink repetition in the fourth time domain interval (even though the fourth time domain interval has the same duplexing configuration as the first time domain interval). The UE 120 may receive a fourth downlink repetition in a fifth time domain interval (5 HD), configured for HD communication, because the fifth time domain interval has the same duplexing configuration as the first time domain interval, and includes a reception opportunity.

In some aspects, repetitions that are skipped are counted toward the nominal quantity of repetitions configured by the DCI (e.g., four repetitions). Accordingly, in example 700, an actual quantity of repetitions received by the UE 120 is two repetitions. While example 700 relates to PDSCH repetitions that begin in an HD time domain interval, example 700 may also apply to PDSCH repetitions that begin in an FD time domain interval, or PUSCH repetitions that begin in an HD or an FD time domain interval.

As indicated above, FIG. 7 is provided as an example. Other examples may differ from what is described with respect to FIG. 7.

Figure 8:
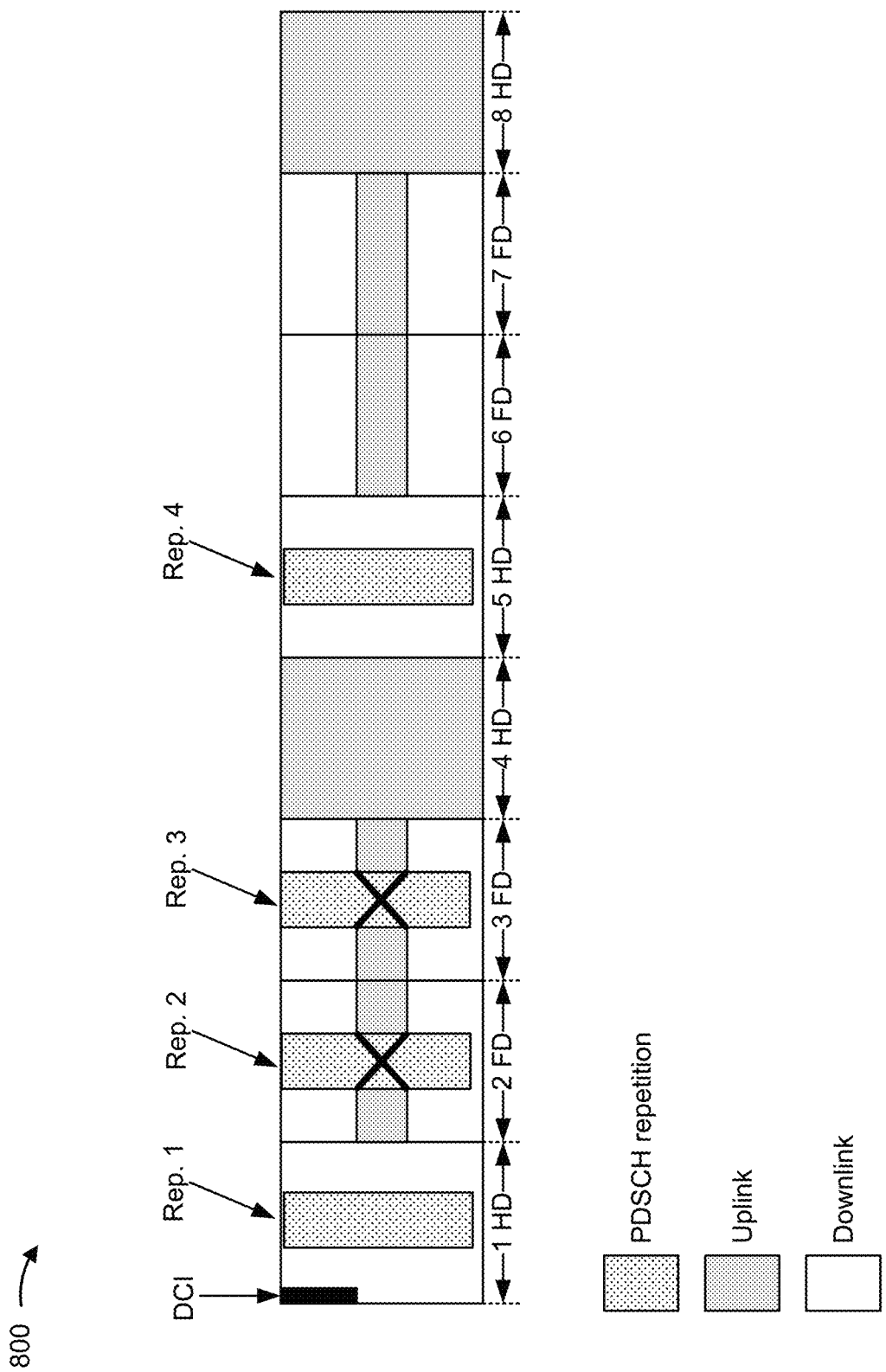

FIG. 8 is a diagram illustrating an example 800 of repetition in FD communication, in accordance with various aspects of the present disclosure. The repetitions of example 800 may correspond to the repetitions described above in connection with FIG. 6. Accordingly, the base station 110 may transmit, and the UE 120 may receive, the repetitions of example 800.

As shown in FIG. 8, DCI may schedule four repetitions of a PDSCH communication in multiple time domain intervals. Moreover, as shown, the UE 120 may receive a first downlink repetition in a first time domain interval (shown as 1 HD), which is configured for HD communication. The UE 120 may rate match second and third downlink repetitions around frequency resources used for uplink communication and/or a guard band in a second time domain interval (2 FD) and a third time domain interval (3 FD).

As shown, there is no reception opportunity in a fourth time domain interval (4 HD), and therefore, the UE 120 does not receive a downlink repetition in the fourth time domain interval. The UE 120 may receive a fourth downlink repetition (e.g., without rate matching) in a fifth time domain interval (5 HD), configured for HD communication, because the fifth time domain interval has the same duplexing configuration as the first time domain interval, and includes a reception opportunity.

While example 800 relates to PDSCH repetitions that begin in an HD time domain interval, example 800 may also apply to PDSCH repetitions that begin in an FD time domain interval, or PUSCH repetitions that begin in an HD or an FD time domain interval.

As indicated above, FIG. 8 is provided as an example. Other examples may differ from what is described with respect to FIG. 8.

Figure 9:
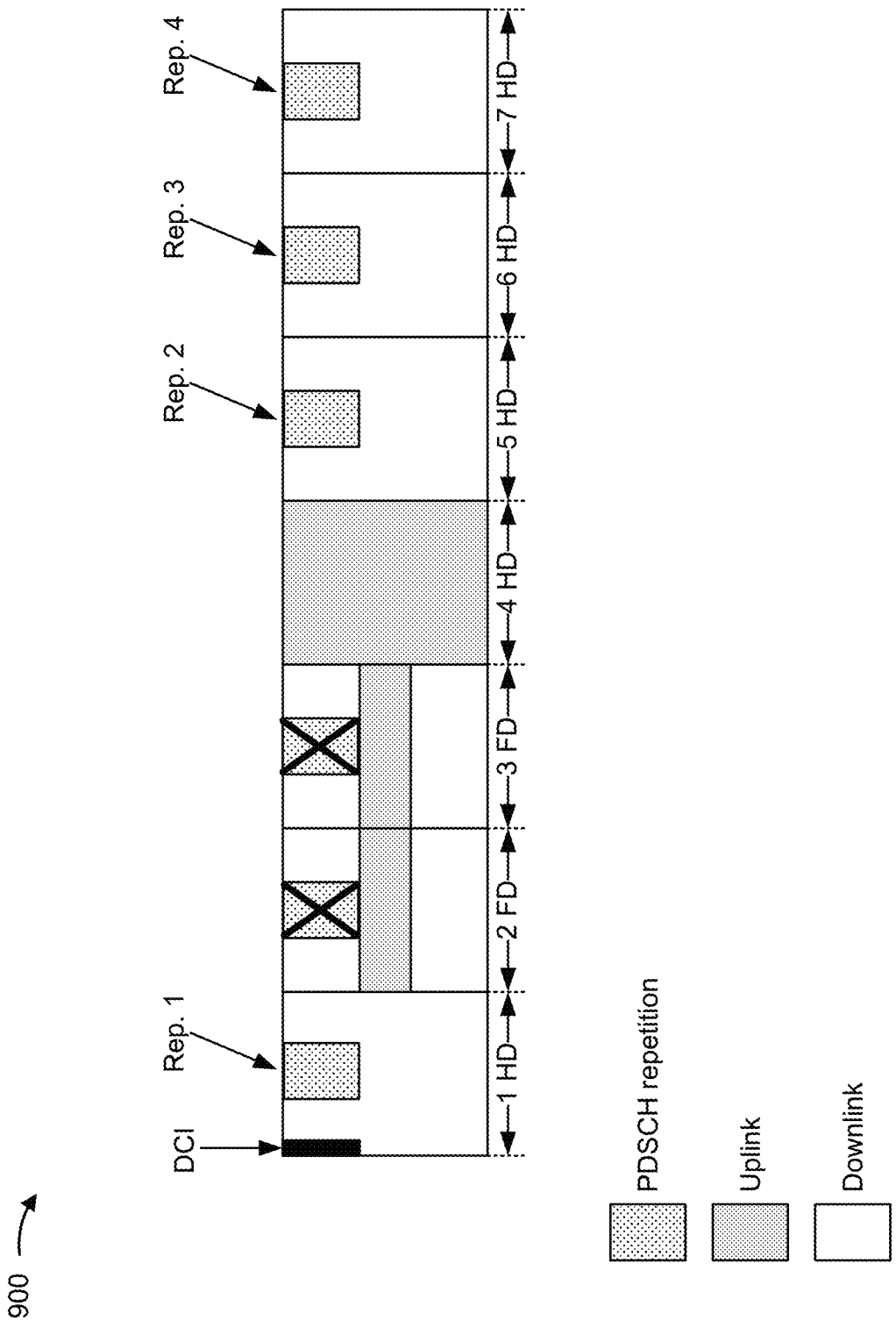

FIG. 9 is a diagram illustrating an example 900 of repetition in FD communication, in accordance with various aspects of the present disclosure. The repetitions of example 900 may correspond to the repetitions described above in connection with FIG. 6. Accordingly, the base station 110 may transmit, and the UE 120 may receive, the repetitions of example 900.

As shown in FIG. 9, DCI may schedule four repetitions of a PDSCH communication in multiple time domain intervals. Moreover, as shown, the UE 120 may receive a first downlink repetition in a first time domain interval, which is configured for HD communication (shown as 1 HD). In this case, the UE 120 may skip second and third downlink repetitions in reception opportunities in a second time domain interval (2 FD) and a third time domain interval (3 FD), configured for FD communication, because the second and third time domain intervals have different duplexing configurations than the first time domain interval.

As shown, there is no reception opportunity in a fourth time domain interval (4 HD), and therefore, the UE 120 does not receive a downlink repetition in the fourth time domain interval. Moreover, as shown, the skipped second and third downlink repetitions may be postponed to a fifth time domain interval (5 HD) and a sixth time domain interval (6 HD), configured for HD communication, because the fifth and sixth time domain intervals have the same duplexing configuration as the first time domain interval, and include reception opportunities. Similarly, the UE 120 may receive a fourth downlink repetition in a seventh time domain interval (7 HD) configured for HD communication.

In some aspects, repetitions that are skipped are not counted toward the nominal quantity of repetitions configured by the DCI (e.g., four repetitions). Accordingly, in example 900, an actual quantity of repetitions received by the UE 120 is four repetitions. While example 900 relates to PDSCH repetitions that begin in an HD time domain interval, example 900 may also apply to PDSCH repetitions that begin in an FD time domain interval, or PUSCH repetitions that begin in an HD or an FD time domain interval.

As indicated above, FIG. 9 is provided as an example. Other examples may differ from what is described with respect to FIG. 9.

Figure 10:
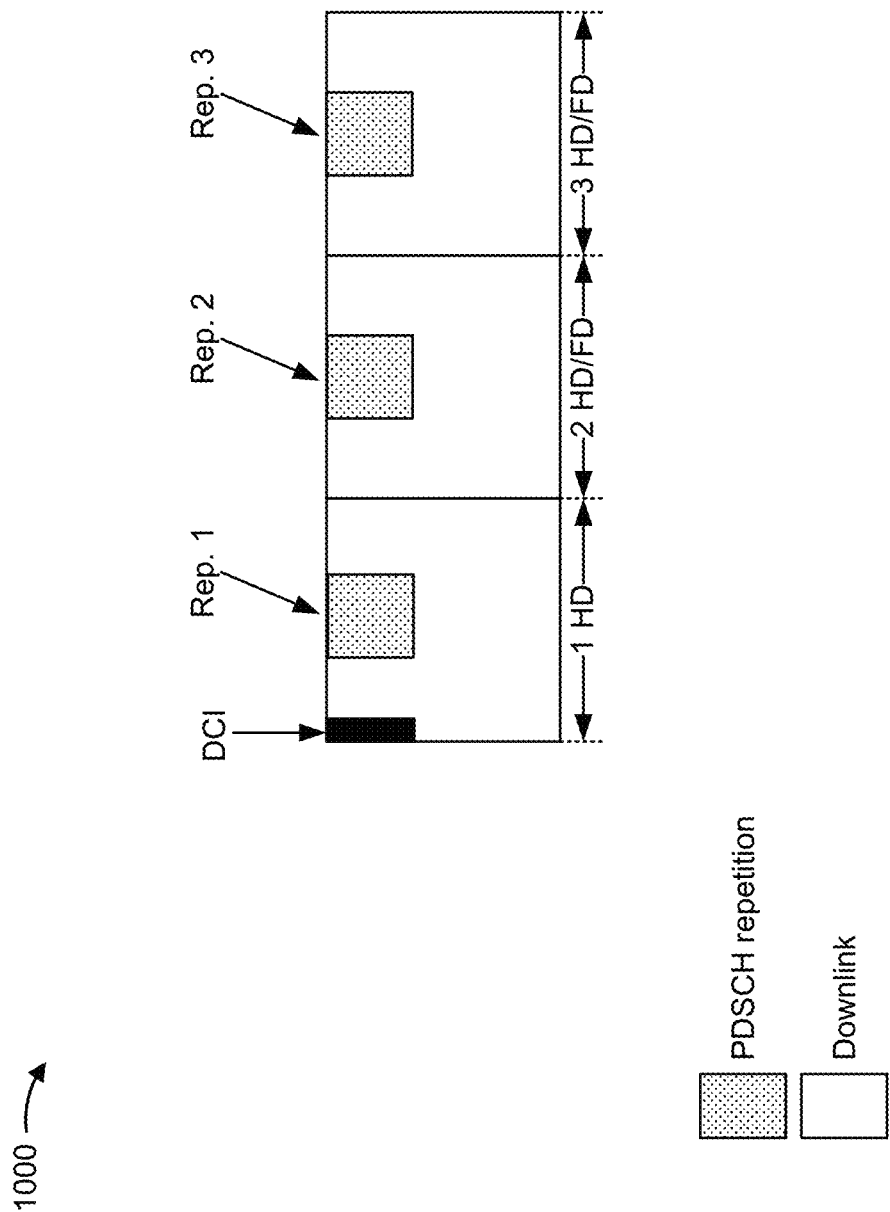

FIG. 10 is a diagram illustrating an example 1000 of repetition in FD communication, in accordance with various aspects of the present disclosure. The repetitions of example 1000 may correspond to the repetitions described above in connection with FIG. 6. Accordingly, the base station 110 may transmit, and the UE 120 may receive, the repetitions of example 1000.

As shown in FIG. 10, DCI may schedule three repetitions of a PDSCH communication in multiple time domain intervals. In addition, a second time domain interval (2 FD) and a third time domain interval (3 FD) may be configured for flexible use of HD communication or FD communication. Accordingly, as shown, the UE 120 may receive a first downlink repetition in a first time domain interval (1 HD), which is configured for HD communication. In this case, the UE 120 may use the same duplexing configuration (e.g., HD) in the second and third time domain intervals that is used for the first time domain interval (e.g., because the second and third time domain intervals are configured for flexible duplexing use).

While example 1000 relates to PDSCH repetitions that begin in an HD time domain interval, example 1000 may also apply to PDSCH repetitions that begin in an FD time domain interval, or PUSCH repetitions that begin in an HD or an FD time domain interval.

As indicated above, FIG. 1000 is provided as an example. Other examples may differ from what is described with respect to FIG. 1000.

Figure 11:
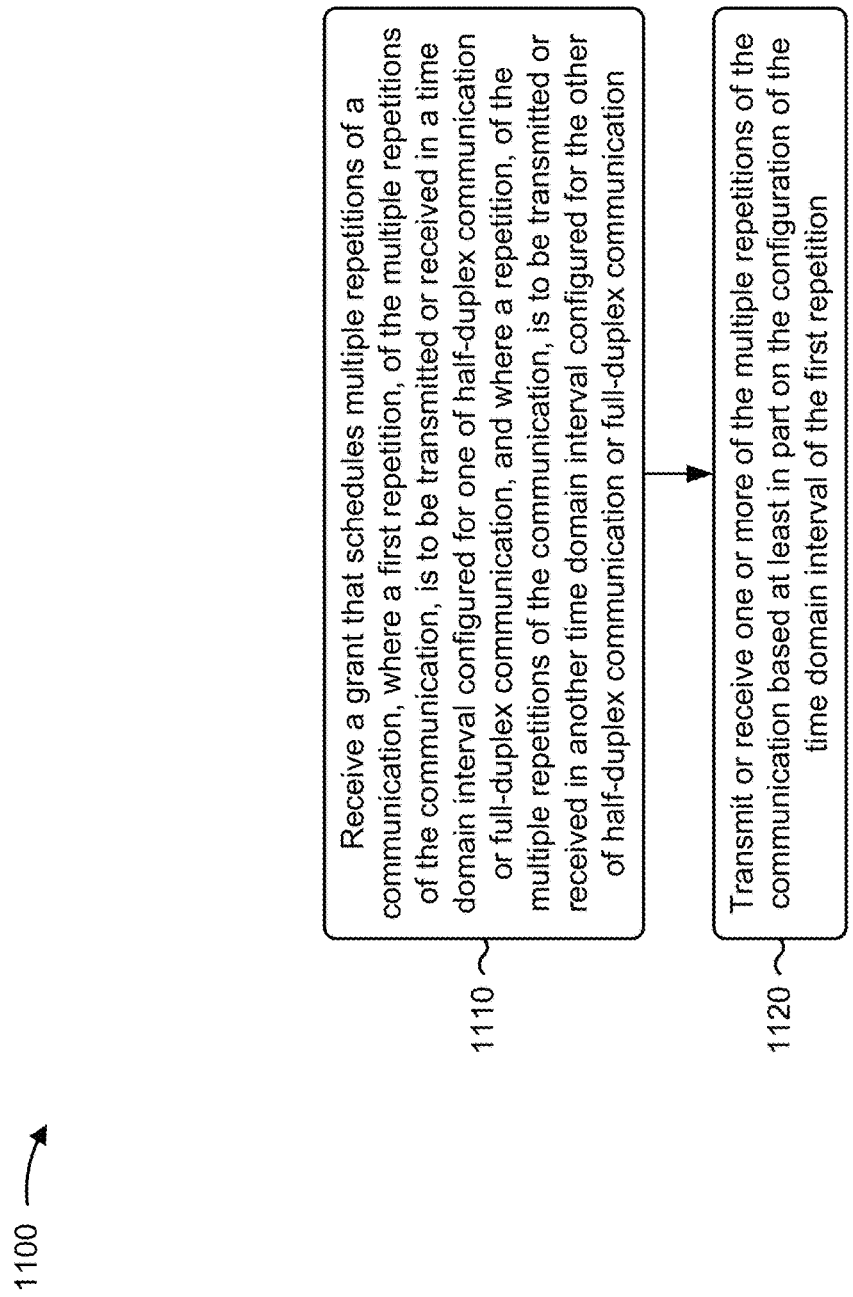
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120, and/or the like) performs operations associated with repetition in FD communication.

As shown in FIG. 11, in some aspects, process 1100 may include receiving a grant that schedules multiple repetitions of a communication, where a first repetition, of the multiple repetitions of the communication, is to be transmitted or received in a time domain interval configured for one of half-duplex communication or full-duplex communication, and where a repetition, of the multiple repetitions of the communication, is to be transmitted or received in another time domain interval configured for the other of half-duplex communication or full-duplex communication (block 1110). For example, the UE (e.g., using antenna 252, DEMOD 254, MIMO detector 256, receive processor 258, controller/processor 280, and/or the like) may receive a grant that schedules multiple repetitions of a communication, as described above. In some aspects, a first repetition, of the multiple repetitions of the communication, is to be transmitted or received in a time domain interval configured for one of half-duplex communication or full-duplex communication. In some aspects, a repetition, of the multiple repetitions of the communication, is to be transmitted or received in another time domain interval configured for the other of half-duplex communication or full-duplex communication.

As further shown in FIG. 11, in some aspects, process 1100 may include transmitting or receiving one or more of the multiple repetitions of the communication based at least in part on the configuration of the time domain interval of the first repetition (block 1120). For example, the UE (e.g., using antenna 252, DEMOD 254, MIMO detector 256, receive processor 258, controller/processor 280, transmit processor 264, TX MIMO processor 266, MOD 254, and/or the like) may transmit or receive one or more of the multiple repetitions of the communication based at least in part on the configuration of the time domain interval of the first repetition, as described above.

Process 1100 may include additional aspects, such as any single aspect or any combination of aspects described below and/or in connection with one or more other processes described elsewhere herein.

In a first aspect, process 1100 includes determining that the repetition of the multiple repetitions is to be transmitted or received in the other time domain interval configured for the other of half-duplex communication or full-duplex communication.

In a second aspect, alone or in combination with the first aspect, transmitting or receiving the one or more of the multiple repetitions includes skipping the repetition.

In a third aspect, alone or in combination with one or more of the first and second aspects, transmitting or receiving the one or more of the multiple repetitions includes skipping the repetition based at least in part on a determination that the repetition is to use a resource that overlaps with frequency resources that are not to be used for a type of the communication in the other time domain interval.

In a fourth aspect, alone or in combination with one or more of the first through third aspects, transmitting or receiving the one or more of the multiple repetitions includes mapping the repetition to a portion of a resource, that is to be used for the repetition, that does not overlap with frequency resources that are not to be used for a type of the communication in the other time domain interval.

In a fifth aspect, alone or in combination with one or more of the first through fourth aspects, the portion of the resource is defined by one or more PRG boundaries.

In a sixth aspect, alone or in combination with one or more of the first through fifth aspects, a DMRS associated with the repetition is also mapped to the portion of the resource.

In a seventh aspect, alone or in combination with one or more of the first through sixth aspects, transmitting or receiving the one or more of the multiple repetitions includes skipping the repetition, and postponing transmission or reception of the repetition to a different time domain interval configured for the one of half-duplex communication or full-duplex communication.

In an eighth aspect, alone or in combination with one or more of the first through seventh aspects, the repetition is transmitted or received in the other time domain interval, configured for flexible use of half-duplex communication or full-duplex communication, according to the configuration of the time domain interval of the first repetition.

In a ninth aspect, alone or in combination with one or more of the first through eighth aspects, the one or more of the multiple repetitions are transmitted or received in a BWP configured for the one of half-duplex communication or full-duplex communication.

In a tenth aspect, alone or in combination with one or more of the first through ninth aspects, the one or more of the multiple repetitions are transmitted or received in a frequency region configured for the one of half-duplex communication or full-duplex communication.

In an eleventh aspect, alone or in combination with one or more of the first through tenths aspects, the frequency region is in a BWP or in a component carrier.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
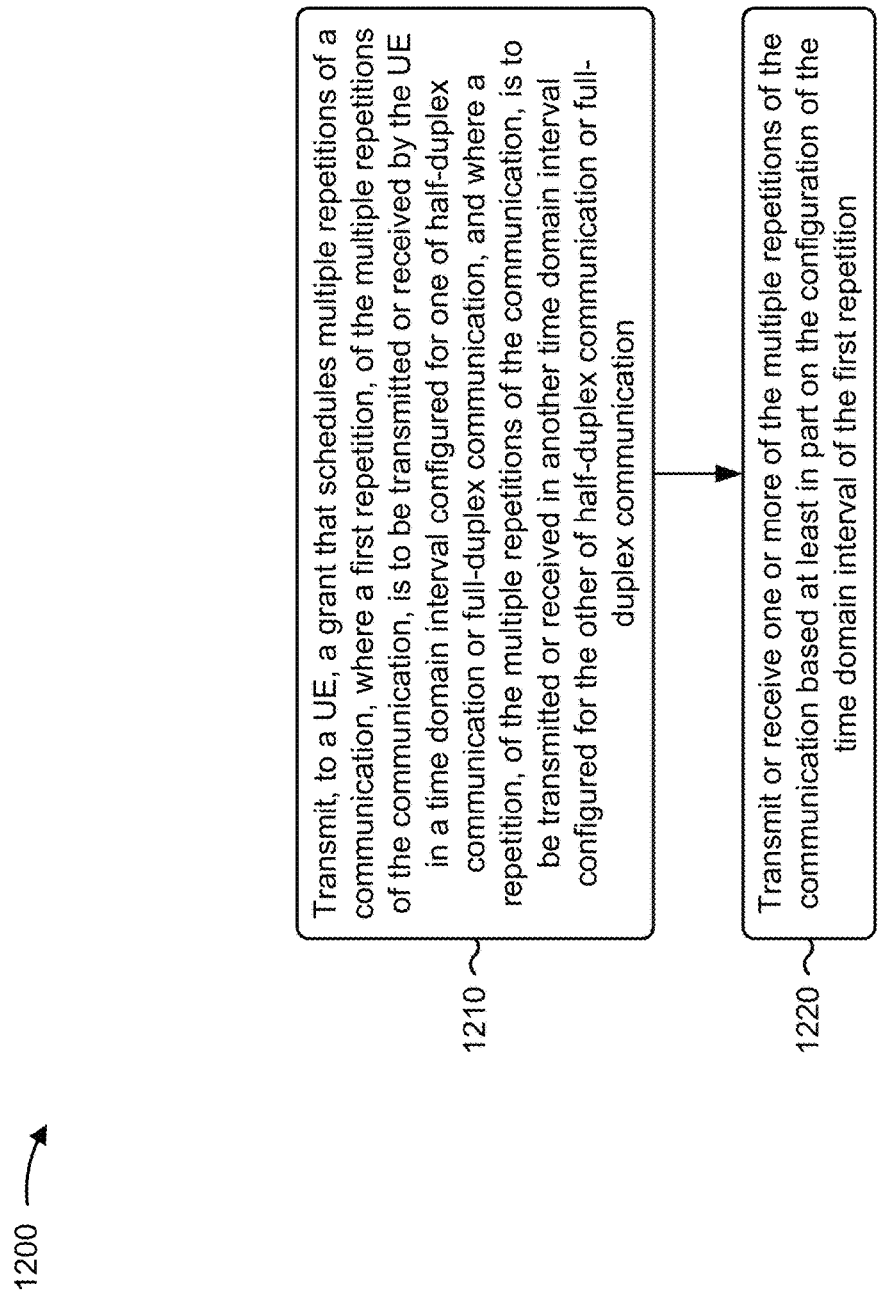
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where the base station (e.g., base station 110, and/or the like) performs operations associated with repetition in FD communication.

As shown in FIG. 12, in some aspects, process 1200 may include transmitting, to a UE, a grant that schedules multiple repetitions of a communication, where a first repetition, of the multiple repetitions of the communication, is to be transmitted or received by the UE in a time domain interval configured for one of half-duplex communication or full-duplex communication, and where a repetition, of the multiple repetitions of the communication, is to be transmitted or received in another time domain interval configured for the other of half-duplex communication or full-duplex communication (block 1210). For example, the base station (e.g., using controller/processor 240, transmit processor 220, TX MIMO processor 230, MOD 232, antenna 234, and/or the like) may transmit, to a UE, a grant that schedules multiple repetitions of a communication, as described above. In some aspects, a first repetition, of the multiple repetitions of the communication, is to be transmitted or received by the UE in a time domain interval configured for one of half-duplex communication or full-duplex communication. In some aspects, a repetition, of the multiple repetitions of the communication, is to be transmitted or received in another time domain interval configured for the other of half-duplex communication or full-duplex communication.

As further shown in FIG. 12, in some aspects, process 1200 may include transmitting or receiving one or more of the multiple repetitions of the communication based at least in part on the configuration of the time domain interval of the first repetition (block 1220). For example, the base station (e.g., using controller/processor 240, transmit processor 220, TX MIMO processor 230, MOD 232, antenna 234, DEMOD 232, MIMO detector 236, receive processor 238, and/or the like) may transmit or receive one or more of the multiple repetitions of the communication based at least in part on the configuration of the time domain interval of the first repetition, as described above.

Process 1200 may include additional aspects, such as any single aspect or any combination of aspects described below and/or in connection with one or more other processes described elsewhere herein.

In a first aspect, process 1200 includes determining that the repetition of the multiple repetitions is to be transmitted or received by the UE in the other time domain interval configured for the other of half-duplex communication or full-duplex communication.

In a second aspect, alone or in combination with the first aspect, transmitting or receiving the one or more of the multiple repetitions includes skipping the repetition.

In a third aspect, alone or in combination with one or more of the first and second aspects, transmitting or receiving the one or more of the multiple repetitions includes skipping the repetition based at least in part on a determination that the repetition is to use a resource that overlaps with frequency resources that are not to be used for a type of the communication in the other time domain interval.

In a fourth aspect, alone or in combination with one or more of the first through third aspects, transmitting or receiving the one or more of the multiple repetitions includes mapping the repetition to a portion of a resource, that is to be used for the repetition, that does not overlap with frequency resources that are not to be used for a type of the communication in the other time domain interval.

In a fifth aspect, alone or in combination with one or more of the first through fourth aspects, the portion of the resource is defined by one or more PRG boundaries.

In a sixth aspect, alone or in combination with one or more of the first through fifth aspects, a DMRS associated with the repetition is also mapped to the portion of the resource.

In a seventh aspect, alone or in combination with one or more of the first through sixth aspects, transmitting or receiving the one or more of the multiple repetitions includes skipping the repetition, and postponing transmission or reception of the repetition to a different time domain interval configured for the one of half-duplex communication or full-duplex communication.

In an eighth aspect, alone or in combination with one or more of the first through seventh aspects, the repetition is transmitted or received in the other time domain interval, configured for flexible use of half-duplex communication or full-duplex communication, according to the configuration of the time domain interval of the first repetition.

In a ninth aspect, alone or in combination with one or more of the first through eighth aspects, the one or more of the multiple repetitions are transmitted or received in a BWP configured for the one of half-duplex communication or full-duplex communication.

In a tenth aspect, alone or in combination with one or more of the first through ninth aspects, the one or more of the multiple repetitions are transmitted or received in a frequency region configured for the one of half-duplex communication or full-duplex communication.

In an eleventh aspect, alone or in combination with one or more of the first through tenths aspects, the frequency region is in a BWP or in a component carrier.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a grant that schedules multiple repetitions of a communication,
      wherein a first repetition, of the multiple repetitions of the communication, is to be communicated in a first direction and in a time domain interval configured for one of half-duplex communication or full-duplex communication, and wherein a second repetition, of the multiple repetitions of the communication, is to be communicated in the first direction and in another time domain interval configured for the other of half-duplex communication or full-duplex communication;

communicating the first repetition of the multiple repetitions of the communication in the first direction based at least in part on the configuration of the time domain interval of the first repetition;

skipping communicating the second repetition, of the multiple repetitions of the communication, in the first direction when a set of resources for communicating the second repetition overlap with the set of frequency domain resources configured for communications in the second direction, wherein the skipped second repetition does not count toward a quantity of repetitions of the multiple repetitions of the communication; and communicating the second repetition, of the multiple repetitions of the communication, when the set of resources for communicating the second repetition does not overlap with the set of frequency resources configured for communication in the second direction.

2. The method of claim 1, further comprising:
transmitting or receiving one or more of the multiple repetitions.

3. The method of claim 2, wherein transmitting or receiving the one or more of the multiple repetitions comprises:
skipping a third repetition based at least in part on a determination that the third repetition is to use a resource that overlaps with frequency resources that are not to be used for a type of the communication in the other time domain interval.

4. The method of claim 2, wherein transmitting or receiving the one or more of the multiple repetitions comprises:
mapping a third repetition to a portion of a resource, that is to be used for the third repetition, that does not overlap with frequency resources that are not to be used for a type of the communication in the other time domain interval.

5. The method of claim 4, wherein the portion of the resource is defined by one or more precoding resource block group boundaries.

6. The method of claim 4, wherein a demodulation reference signal associated with the second repetition is also mapped to the portion of the resource.

7. The method of claim 1, wherein skipping communicating the second repetition comprises:
skipping the second repetition, and postponing a transmission or a reception of the second repetition to a different time domain interval configured for the one of half-duplex communication or full-duplex communication.

8. The method of claim 1, wherein a third repetition is transmitted or received in the other time domain interval, configured for flexible use of half-duplex communication or full-duplex communication, according to the configuration of the time domain interval of the first repetition.

9. The method of claim 1, wherein one or more of the multiple repetitions are transmitted or received in a frequency region configured for the one of half-duplex communication or full-duplex communication.

10. The method of claim 9, wherein the frequency region is in a bandwidth part or in a component carrier.

11. A method of wireless communication performed by a network node, comprising:
transmitting, to a user equipment (UE), a grant that schedules multiple repetitions of a communication, wherein a first repetition, of the multiple repetitions of the communication, is to be communicated in a first direction and in a time domain interval configured for one of half-duplex communication or full-duplex communication, and wherein a second repetition, of the multiple repetitions of the communication, is to be communicated in the first direction in another time domain interval configured for the other of half-duplex communication or full-duplex communication;

communicating the first repetition of the multiple repetitions of the communication in the first direction based at least in part on the configuration of the time domain interval of the first repetition;

skipping communicating the second repetition, of the multiple repetitions of the communication, in the first direction when a set of resources for communicating the second repetition overlap with the set of frequency domain resources configured for communications in the second direction, wherein the skipped second repetition does not count toward a quantity of repetitions of the multiple repetitions of the communication; and communicating the second repetition, of the multiple repetitions of the communication, when the set of resources for communicating the second repetition does not overlap with the set of frequency resources configured for communication in the second direction.

12. The method of claim 11, further comprising:
transmitting or receiving one or more of the multiple repetitions.

13. The method of claim 12, wherein transmitting or receiving the one or more of the multiple repetitions comprises:
skipping a third repetition based at least in part on a determination that the third repetition is to use a resource that overlaps with frequency resources that are not to be used for a type of the communication in the other time domain interval.

14. The method of claim 13, wherein transmitting or receiving the one or more of the multiple repetitions comprises:
mapping a third repetition to a portion of a resource, that is to be used for the third repetition, that does not overlap with frequency resources that are not to be used for a type of the communication in the other time domain interval.

15. The method of claim 14, wherein the portion of the resource is defined by one or more precoding resource block group boundaries.

16. The method of claim 14, wherein a demodulation reference signal associated with the second repetition is also mapped to the portion of the resource.

17. The method of claim 11, wherein skipping communicating the second repetition comprises:
skipping the second repetition, and postponing transmission or reception of the second repetition to a different time domain interval configured for the one of half-duplex communication or full-duplex communication.

18. The method of claim 11, wherein a third repetition is transmitted or received in the other time domain interval, configured for flexible use of half-duplex communication or full-duplex communication, according to the configuration of the time domain interval of the first repetition.

19. The method of claim 11, wherein one or more of the multiple repetitions are transmitted or received in a frequency region configured for the one of half-duplex communication or full-duplex communication.

20. The method of claim 19, wherein the frequency region is in a bandwidth part or in a component carrier.

21. A user equipment (UE) for wireless communication, comprising:
a memory; and
one or more processors coupled to the memory, the one or more processors configured to:
receive a grant that schedules multiple repetitions of a communication,
wherein a first repetition, of the multiple repetitions of the communication, is to be communicated in a first direction and in a time domain interval configured for one of half-duplex communication or full-duplex communication, and
wherein a second repetition, of the multiple repetitions of the communication, is to be communicated in the first direction and in another time domain interval configured for the other of half-duplex communication or full-duplex communication;
communicate the first repetition of the multiple repetitions of the communication based at least in part on the configuration of the time domain interval of the first repetition;
skip communicating the second repetition, of the multiple repetitions of the communication, in the first direction when a set of resources for communicating the second repetition overlap with a set of frequency domain resources configured for communications in a second direction, wherein the skipped second repetition does not count toward a quantity of repetitions of the multiple repetitions of the communication; and
communicate the second repetition, of the multiple repetitions of the communication, when the set of resources for communicating the second repetition does not overlap with the set of resources configured for communication in the second direction.

22. The UE of claim 21, wherein the one or more processors are further configured to:
transmit or receive one or more of the multiple repetitions.

23. The UE of claim 22, wherein the one or more processors, when transmitting or receiving the one or more of the multiple repetitions, are configured to:
skip a third repetition based at least in part on a determination that the third repetition is to use a resource that overlaps with frequency resources that are not to be used for a type of the communication in the other time domain interval.

24. The UE of claim 22, wherein the one or more processors, when transmitting or receiving the one or more of the multiple repetitions, are configured to:
map a third repetition to a portion of a resource, that is to be used for the third repetition, that does not overlap with frequency resources that are not to be used for a type of the communication in the other time domain interval.

25. The UE of claim 21, wherein the one or more processors, when skipping communicating the second repetition, are configured to:
skip the second repetition, and postpone a transmission or a reception of the second repetition to a different time domain interval configured for the one of half-duplex communication or full-duplex communication.

26. A network node for wireless communication, comprising:
a memory; and
one or more processors coupled to the memory, the one or more processors configured to:
transmit, to a user equipment (UE), a grant that schedules multiple repetitions of a communication,
wherein a first repetition, of the multiple repetitions of the communication, is to be communicated in a first direction and in a time domain interval configured for one of half-duplex communication or full-duplex communication, and
wherein a second repetition, of the multiple repetitions of the communication, is to be communicated in the first direction and in another time domain interval configured for the other of half-duplex communication or full-duplex communication;
communicate the first repetition of the multiple repetitions of the communication based at least in part on the configuration of the time domain interval of the first repetition;
skip communicating the second repetition, of the multiple repetitions of the communication, in the first direction when a set of resources for communicating the second repetition overlap with the set of frequency domain resources configured for communications in the second direction, wherein the skipped second repetition does not count toward a quantity of repetitions of the multiple repetitions of the communication; and
communicate the second repetition, of the multiple repetitions of the communication, when the set of resources for communicating the second repetition does not overlap with the set of frequency resources configured for communication in the second direction.

27. The network node of claim 26, wherein the one or more processors are further configured to:
transmit or receive one or more of the multiple repetitions.

28. The network node of claim 27, wherein the one or more processors, when transmitting or receiving the one or more of the multiple repetitions, are configured to:
skip a third repetition based at least in part on a determination that the third repetition is to use a resource that overlaps with frequency resources that are not to be used for a type of the communication in the other time domain interval.

29. The network node of claim 27, wherein the one or more processors, when transmitting or receiving the one or more of the multiple repetitions, are configured to:
map a third repetition to a portion of a resource, that is to be used for the third repetition, that does not overlap with frequency resources that are not to be used for a type of the communication in the other time domain interval.

30. The network node of claim 26, wherein the one or more processors, when skipping communicating the second repetition, are configured to:
skip the second repetition, and postpone a transmission or a reception of the second repetition to a different time domain interval configured for the one of half-duplex communication or full-duplex communication.

* * * * *